US009470555B2

(12) United States Patent
Fujita

(10) Patent No.: US 9,470,555 B2
(45) Date of Patent: Oct. 18, 2016

(54) ENCODER

(75) Inventor: Hiromasa Fujita, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 425 days.

(21) Appl. No.: 12/915,848

(22) Filed: Oct. 29, 2010

(65) Prior Publication Data

US 2011/0106488 A1  May 5, 2011

(30) Foreign Application Priority Data

Oct. 30, 2009  (JP) ................. 2009-251334

(51) Int. Cl.
*G01C 9/00*  (2006.01)
*G01D 5/244*  (2006.01)
*G01C 22/00*  (2006.01)

(52) U.S. Cl.
CPC ........... *G01D 5/2448* (2013.01); *G01C 22/006* (2013.01)

(58) Field of Classification Search
CPC ...... G01C 22/006; G01C 21/20; G01B 7/02; G01B 7/14; G01B 11/02
USPC ........................................................ 702/150
See application file for complete search history.

(56) References Cited

U.S. PATENT DOCUMENTS

| 7,256,391 | B2 * | 8/2007 | Kuroda et al. ........... 250/231.13 |
| 2006/0114133 | A1 * | 6/2006 | Fujita ............................... 341/50 |
| 2007/0008192 | A1 * | 1/2007 | Fujita ............................... 341/50 |
| 2009/0096638 | A1 * | 4/2009 | Fujita ............................... 341/13 |
| 2011/0057092 | A1 * | 3/2011 | Hane ........................ 250/231.11 |
| 2011/0218760 | A1 * | 9/2011 | Takahama ................. G01P 3/64 702/150 |

FOREIGN PATENT DOCUMENTS

| JP | 3-31720 | 2/1991 |
| JP | 6-288789 | 10/1994 |
| JP | 7-218290 | 8/1995 |
| JP | 10-311741 | 11/1998 |
| JP | 2001-056238 | 2/2001 |

(Continued)

OTHER PUBLICATIONS

English Abstract of JP 10-311741, Nov. 1998.*

(Continued)

*Primary Examiner* — Michael Nghiem
(74) *Attorney, Agent, or Firm* — Scully, Scott, Murphy & Presser, PC

(57) ABSTRACT

An encoder includes a scale, an encoder head, and a multiplication processing circuit. The encoder head includes a signal generation unit configured to generate a substantially sine-wave signal, and an output unit configured to output one of the substantially sine-wave signal and the center voltage of the substantially sine-wave signal to the multiplication processing circuit. The multiplication processing circuit includes a mode switching unit configured to switch a processing mode to one of an offset voltage detection processing mode in which an offset voltage serving as a difference between a predetermined reference voltage and the center voltage is corrected, and a displacement amount detection processing mode in which displacement detection processing is performed, an offset voltage detection unit configured to detect the offset voltage, and an offset voltage correction unit configured to correct an offset voltage of the substantially sine-wave signal output from the output unit.

5 Claims, 7 Drawing Sheets

(56) References Cited

FOREIGN PATENT DOCUMENTS

| | | |
|---|---|---|
| JP | 2006-30059 | 2/2006 |
| JP | 2007-17339 A | 1/2007 |

OTHER PUBLICATIONS

Japanese Official Action dated May 28, 2013 from related application JP 2009-251334 together with an English language translation.

* cited by examiner

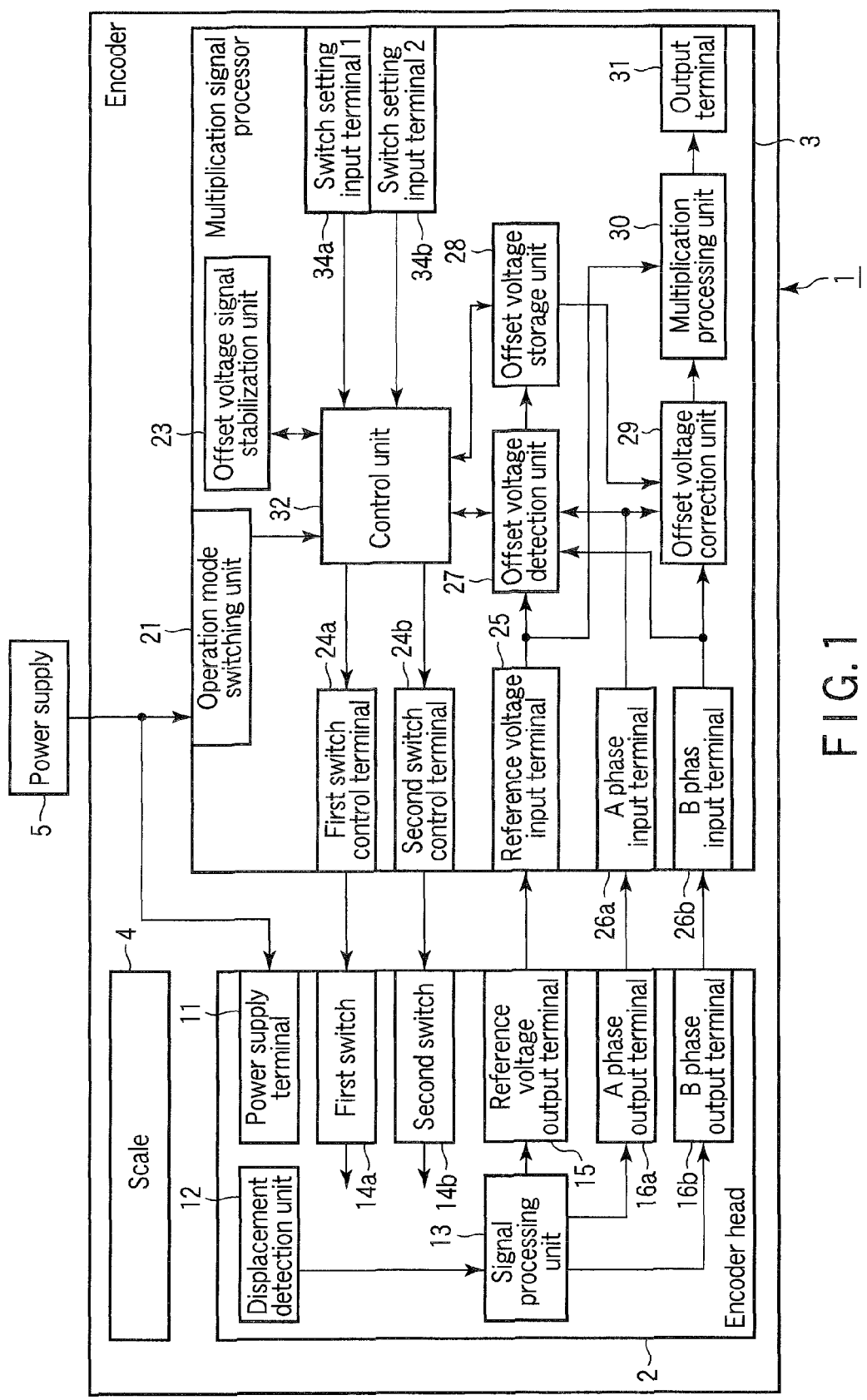
F I G. 1

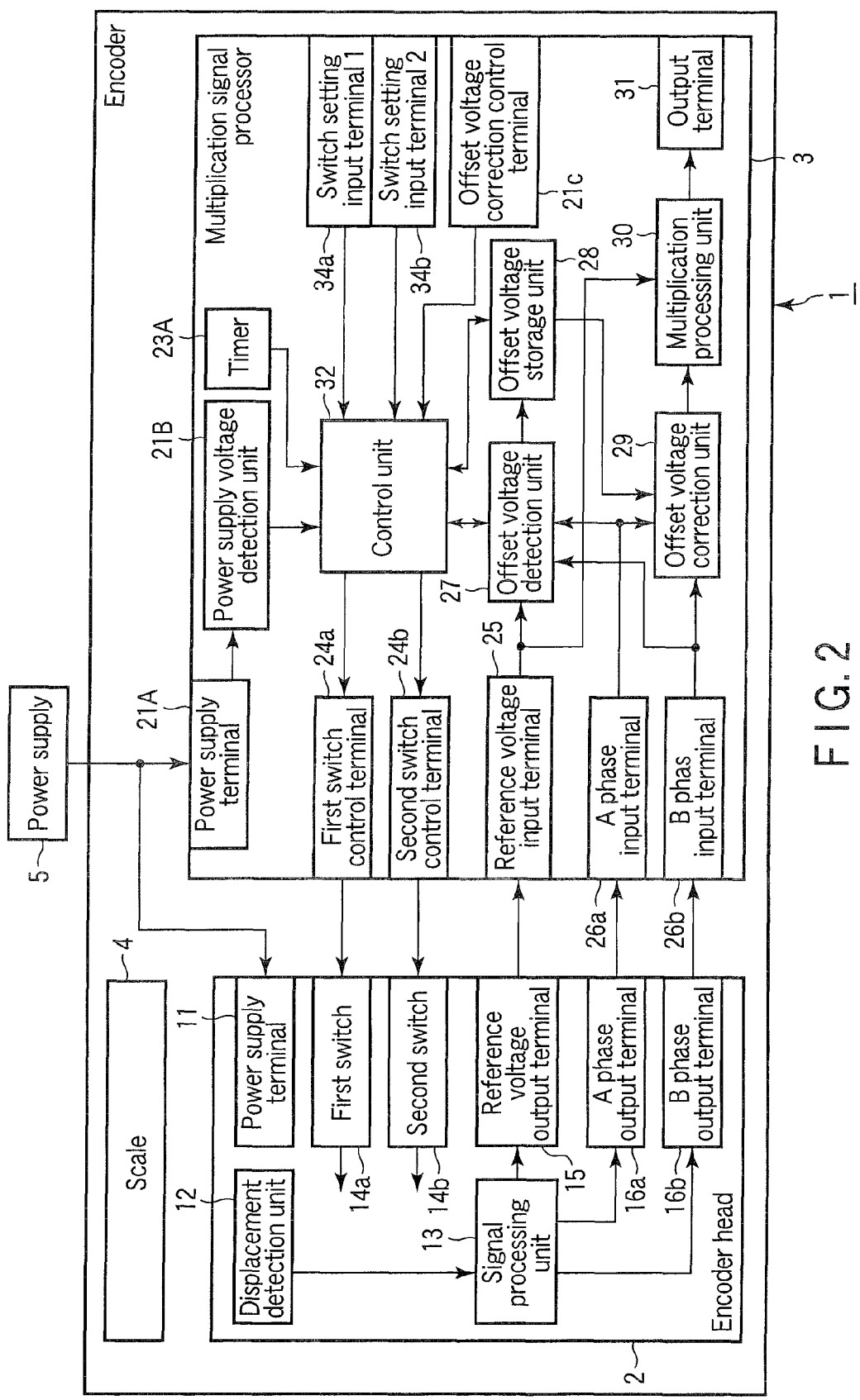
F I G. 2

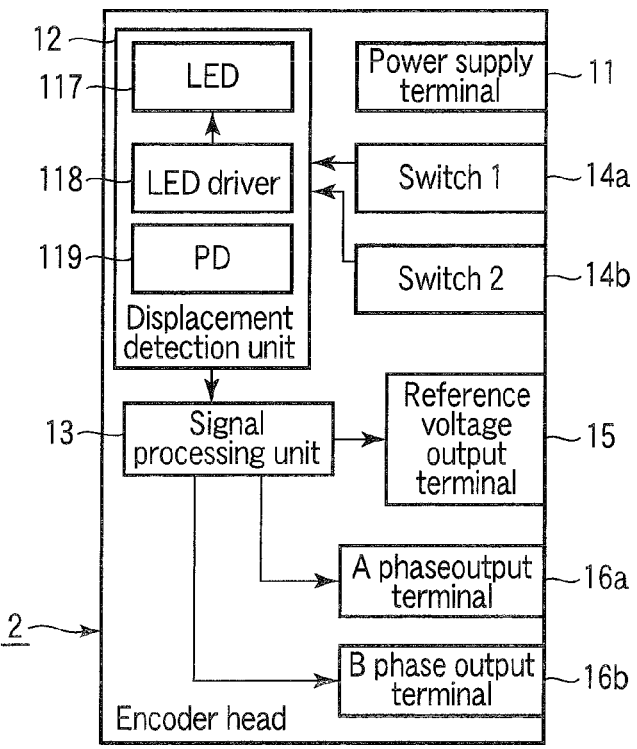
F I G. 5A
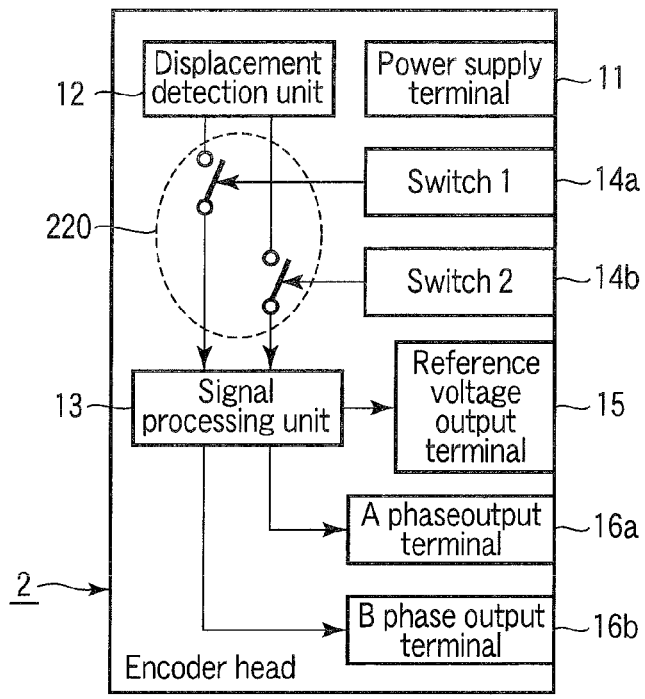
F I G. 5B

ENCODER

CROSS-REFERENCE TO RELATED APPLICATIONS

This application is based upon and claims the benefit of priority from prior Japanese Patent Application No. 2009-251334, filed Oct. 30, 2009, the entire contents of which are incorporated herein by reference.

BACKGROUND OF THE INVENTION

1. Field of the Invention

The present invention relates to a displacement sensor and, more particularly, to an encoder.

2. Description of the Related Art

Conventionally, an encoder used as a displacement sensor has been known. The encoder outputs a plurality of periodic signals different in phase from each other. The output signals are input to a counter and counted, detecting the displacement of a target object or the like based on the count processing result. To enable the count processing by the counter, the encoder outputs signals having undergone predetermined processing by a processing circuit which performs, for example, conversion processing into a digital signal and processing for increasing the displacement detection resolution.

Such an encoder 1000 can measure the traveling direction, position, displacement, displacement speed, and the like of a target object. The encoder 1000 is generally configured as shown in FIG. 6. More specifically, the encoder 1000 comprises an original signal generating means 1001 and original signal processing means 1002.

The original signal generating means 1001 includes a light emitting element 1101, a rotating plate 1102, a stationary plate 1103, a light receiving element 1104, current-to-voltage converters 1105, and differential circuits 1106. The rotating plate 1102 is fixed to a motor shaft and has optical slits. The stationary plate 1103 is fixed to a motor bracket and has at least four segments of slits identical to those of the rotating plate 1102. The light receiving element 1104 has light receiving portions corresponding to at least the segments of the stationary plate 1103. Each current-to-voltage converter 1105 converts an output current from the light receiving element 1104 into a voltage. Each differential circuit 1106 calculates the difference between signals converted into voltages by the current-to-voltage converters 1105.

In the encoder 1000 having this arrangement, light emitted by the light emitting element 1101 passes through the slits of the rotating plate 1102 and stationary plate 1103 and enters the light receiving element 1104. The light receiving element 1104 outputs a current corresponding to the incident light.

The slits of the rotating plate 1102 and the slits of the respective segments of the stationary plate 1103 are formed so that, as the rotating plate 1102 rotates, the current is output as pseudo sine-wave signals a and b serving as signals of two phases with a phase difference of about 90°, and signals $\bar{a}$ and $\bar{b}$ opposite in phase to the signals a and b.

The current-to-voltage converters 1105 convert the pseudo sine-wave signals a and b and the opposite-phase signals $\bar{a}$ and $\bar{b}$ output from the light receiving element 1104 into voltage signals using a reference voltage as the reference.

To remove the DC component of an optical signal, the differential circuits 1106 calculate CA=a−$\bar{a}$, CB=b−$\bar{b}$, −CA= $\bar{a}$−a using a reference voltage as the reference, outputting pseudo sine-wave signals of three phases.

More specifically, CA and CB are pseudo sine-wave signals with a phase difference of about 90°, and CA and −CA are pseudo sine-wave signals with a phase difference of about 180°.

The original signal processing means 1002 performs multiplication processing to divide the pseudo sine-wave signals of three phases output from the original signal generating means 1001 by a predetermined division number. Encoder square-wave signals obtained by the multiplication processing by the original signal processing means 1002 are signals countable by the counter having a predetermined resolution.

Details of the original signal processing means 1002 are as follows. The original signal processing means 1002 includes a sine-wave signal generating means 1201, impedance matching means 1202, comparing means 1203, and signal multiplying means 1204.

The sine-wave signal generating means 1201 resistance-divides the pseudo sine-wave signals CA, CB, and −CA output from the original signal generating means 1001, generating a plurality of pseudo sine-wave signals different in phase.

The impedance matching means 1202 executes output impedance matching of a signal line, and phase adjustment by CR coupling with the input capacitance of the subsequent comparing means 1203.

The comparing means 1203 binarizes a pseudo sine-wave signal output from the sine-wave signal generating means 1201 using the reference voltage, generating a digital signal.

The signal multiplying means 1204 performs logical processing for the digital signal output from the comparing means 1203, generating an encoder square-wave signal.

Owing to variations of the current-to-voltage converters 1105 and differential circuits 1106 and the like, different offset voltages exist between the center voltages of the pseudo sine-wave signals CA, CB, and −CA of three phases output from the original signal generating means 1001, and the reference voltage.

The offset voltage generates a phase error in processes by the sine-wave signal generating means 1201 and comparing means 1203 in the original signal processing means 1002, and impairs even the linearity of an encoder square-wave signal output from the original signal processing means 1002. When the amplitudes of the pseudo sine-wave signals CA, CB, and −CA are small, the encoder square-wave signal itself may not be generated.

BRIEF SUMMARY OF THE INVENTION

The present invention has been made in consideration of the above situation, and has its object to provide an encoder which solves the problem of the phase error arising from the offset voltage, and improves the linearity of an encoder square-wave signal serving as an output signal.

In order to achieve the above object, according to a first aspect of the invention, there is provided an encoder comprising a scale, an encoder head configured to generate a signal based on a relative displacement from the scale, and a multiplication processing circuit configured to perform multiplication processing for a signal generated by the encoder head, the encoder head comprising:

a displacement detection unit configured to detect the relative displacement of the scale and the encoder head;

a signal generation unit configured to generate a substantially sine-wave signal based on the displacement detected by the displacement detection unit;

a center voltage output setting unit configured to make a setting for outputting a center voltage of the substantially sine-wave signal generated by the signal generation unit to the multiplication processing circuit; and an output unit configured to output one of the substantially sine-wave signal and the center voltage of the substantially sine-wave signal to the multiplication processing circuit, and the multiplication processing circuit comprising:

a mode switching unit configured to switch a processing mode to one of an offset voltage detection processing mode in which an offset voltage serving as a difference between a predetermined reference voltage and the center voltage is corrected, and a displacement amount detection processing mode in which displacement detection processing is performed;

a control unit configured to control the center voltage output setting unit;

an offset voltage detection unit configured to, when the mode switching unit switches the processing mode to the offset voltage detection processing mode, detect the offset voltage based on the center voltage of the substantially sine-wave signal output from the output unit, and the predetermined reference voltage;

an offset voltage correction unit configured to, when the mode switching unit switches the processing mode to the displacement amount detection processing mode, correct an offset voltage of the substantially sine-wave signal output from the output unit based on the offset voltage detected by the offset voltage detection unit; and a multiplication processing unit configured to perform multiplication processing for the substantially sine-wave signal corrected by the offset voltage correction unit.

The present invention can provide an encoder which solves the problem of the phase error arising from the offset voltage, and improves the linearity of an encoder square-wave signal serving as an output signal.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram exemplifying the arrangement of an encoder according to an embodiment of the present invention;

FIG. 2 is a block diagram exemplifying the arrangement of the encoder in which a multiplication signal processor is embodied in the arrangement shown in FIG. 1;

FIG. 5A is a block diagram exemplifying the arrangement of the encoder head of an encoder according to the first modification;

FIG. 5B is a block diagram exemplifying the arrangement of the encoder head of an encoder according to the second modification;

DETAILED DESCRIPTION OF THE INVENTION

Figure 3A:
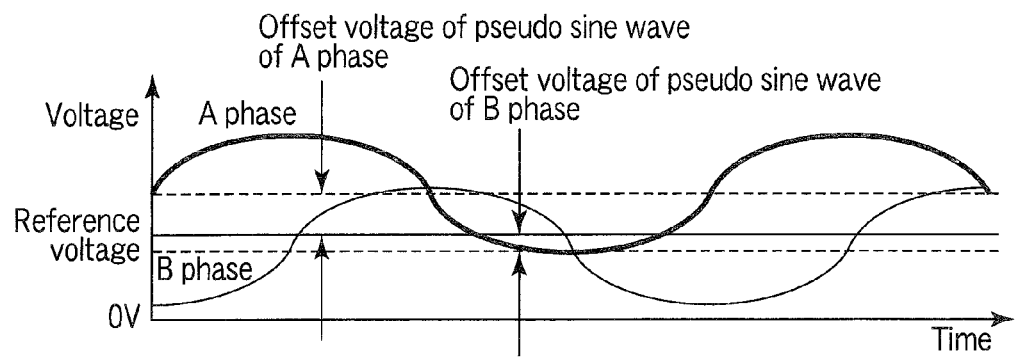
FIG. 3A is a graph exemplifying offset voltage detection processing.

An encoder according to an embodiment of the present invention will now be described with reference to the accompanying drawing.

FIG. 1 is a block diagram exemplifying the arrangement of the encoder according to the embodiment. As shown in FIG. 1, an encoder 1 comprises an encoder scale (to be simply referred to as a scale) 4, encoder head 2, and multiplication signal processor 3. The encoder 1 receives power from a power supply 5 and operates.

The encoder head 2 includes a power supply connection terminal 11, displacement detection unit 12, signal processing unit 13, first switch 14a, second switch 14b, reference voltage output terminal 15, A phase output terminal 16a, and B phase output terminal 16b.

The power supply connection terminal 11 is a terminal for connecting the power supply.

The displacement detection unit 12 has a light source for detecting the displacement of the encoder head 2 and scale 4, a detector, and slits. More specifically, when the encoder 1 is an optical encoder, the light source is, e.g., an LED or vertical cavity surface emitting laser, and the detector is, e.g., a photodetector (PD). For example, the slits and LED form a coherent light source.

The signal processing unit 13 generates an almost sine-wave analog signal as an encoder signal based on a signal detected by the displacement detection unit 12. When the encoder 1 is, e.g., an optical encoder, the signal processing unit 13 includes a current-to-voltage conversion circuit, DC component removal circuit, signal amplifier circuit, reference voltage generation circuit, signal correction circuit, and S/N improvement circuit.

The first switch 14a is controlled via a first switch control terminal 24a (details of which will be described later), and outputs the center voltage of the almost sine-wave analog signal from the A phase output terminal 16a.

Similarly, the second switch 14b is controlled via a second switch control terminal 24b (details of which will be described later), and outputs the center voltage of the almost sine-wave analog signal from the B phase output terminal 16b.

In this example, the two switches are arranged, but the number of switches arranged may be one, or three or more.

More specifically, the first switch 14a and second switch 14b perform processing not to transfer, to the signal processing unit 13, a displacement signal which is a change of the signal based on the displacement of the encoder head 2 and scale 4 that is detected by the displacement detection unit 12. By this processing, the center voltages of the almost sine-wave analog signals are output from the A phase output terminal 16*a* and B phase output terminal 16*b*.

Note that the first switch 14*a* and second switch 14*b* have logic fixing units which regard a case in which control signals indicating the setting states of the first switch 14*a* and second switch 14*b* are not input, as a case in which control signals indicating predetermined setting states have been input. That is, predetermined initial states are set for the first switch 14*a* and second switch 14*b*.

The reference voltage output terminal 15 is a terminal for outputting a voltage to be used as the reference voltage of an almost sine-wave analog signal generated by the signal processing unit 13.

The A phase output terminal 16*a* and B phase output terminal 16*b* are terminals for outputting almost sine-wave analog signals generated by the signal processing unit 13 or its center voltage. In this example, the two terminals are arranged to output almost sine-wave analog signals of two phases. For example, three terminals may be arranged to output almost sine-wave analog signals of three phases.

As described above, the encoder head 2 detects the displacement of the encoder head 2 and scale 4 to output almost sine-wave analog signals of two phases with a phase difference of almost 90°.

The multiplication signal processor 3 includes an operation mode switching unit 21, an offset voltage signal stabilization unit 23, the first switch control terminal 24*a*, the second switch control terminal 24*b*, a reference voltage input terminal 25, an A phase input terminal 26*a*, a B phase input terminal 26*b*, an offset voltage detection unit 27, an offset voltage storage unit 28, an offset voltage correction unit 29, a multiplication processing unit 30, an output terminal 31, a control unit 32, a first switch setting input terminal 34*a*, and a second switch setting input terminal 34*b*.

FIG. 2 is a block diagram exemplifying the arrangement of the encoder 1 in which the arrangement of the multiplication signal processor 3 is further embodied. More specifically, in the multiplication signal processor 3 shown in FIG. 2, the operation mode switching unit 21 shown in FIG. 1 is formed from a power supply terminal 21A, power supply voltage detection unit 21B, and offset voltage correction control terminal 21C. The offset voltage signal stabilization unit 23 is formed from a timer 23A.

The operation mode switching unit 21 switches at least the multiplication signal processor 3 and encoder head 2 between a mode (to be referred to as an offset voltage detection mode) in which "offset voltage detection" to be described later is done, and a mode (to be referred to as a displacement amount detection processing mode) in which offset voltage correction based on an offset voltage detected in the offset voltage detection mode, and displacement amount detection processing are performed.

The offset voltage signal stabilization unit 23 stabilizes the offset voltage (in other words, stabilizes the center voltage of an almost sine-wave analog signal) in the offset voltage detection mode.

That is, the offset voltage signal stabilization unit 23 performs processing for accurately detecting the offset voltage of the center voltage of an almost sine-wave analog signal output from the encoder head 2.

More specifically, after switching to the offset voltage detection mode by the control unit 32, the timer 23A measures the lapse of a predetermined time (time until the encoder head 2 starts a stable operation) after the mode switching time.

Based on the measurement by the timer 23A, the control unit 32 waits for a predetermined time until the center voltage value of the almost sine-wave analog signal is stabilized.

Note that the control unit 32 may sample values output from the A phase output terminal 16*a* and B phase output terminal 16*b* one or more times, and detect the stability of the center voltage of the almost sine-wave analog signal by referring to a change of the sampling value, the average, or the like based on the sampling result.

However, when the encoder head 2 can operate stably even before an applied power supply voltage reaches a predetermined potential VM, the processing (stabilization processing) of detecting the stability of the center voltage is unnecessary.

In offset voltage detection processing, when even a signal input to the reference voltage input terminal 25 of the multiplication signal processor 3 needs to have a stable value, it is preferable to similarly detect the stability of even the signal input to the reference voltage input terminal 25 (signal output from the reference voltage output terminal 15 of the encoder head 2).

After the time measurement by the timer 23A ends (the center voltage values of almost sine-wave analog signals output from the A phase output terminal 16*a* and B phase output terminal 16*b* of the encoder head 2 are stabilized), the control unit 32 starts controlling the first switch 14*a* and second switch 14*b* via the first switch control terminal 24*a* and second switch control terminal 24*b* so as to output the center voltages of almost sine-wave analog signals from the A phase output terminal 16*a* and B phase output terminal 16*b* of the encoder head 2.

The first switch control terminal 24*a* and second switch control terminal 24*b* are terminals for outputting settings to the first switch 14*a* and second switch 14*b*, respectively, based on instructions from the control unit 32.

The reference voltage input terminal 25 is a terminal for inputting the reference voltage of an almost sine-wave analog signal output from the reference voltage output terminal 15 of the encoder head 2.

The A phase input terminal 26*a* is a terminal for inputting an almost sine-wave analog signal output from the A phase output terminal 16*a*. Similarly, the B phase input terminal 26*b* is a terminal for inputting an almost sine-wave analog signal output from the B phase output terminal 16*b*.

The offset voltage detection unit 27 detects an offset voltage after stabilization processing by the offset voltage signal stabilization unit 23.

The offset voltage storage unit 28 stores an offset voltage detected by the offset voltage detection unit 27. Examples of the offset voltage storage unit 28 are a nonvolatile memory and volatile memory. When the offset voltage storage unit 28 is formed from a volatile memory, the offset voltage is preferably detected every time the encoder is powered (turned on).

By referring to the offset voltage value stored in the offset voltage storage unit 28, the offset voltage correction unit 29 corrects the offset voltage of an almost sine-wave analog signal output from the encoder head 2.

Based on the almost sine-wave analog signal corrected by the offset voltage correction unit 29, the multiplication processing unit 30 generates an encoder square-wave signal having a resolution four or more times higher than the wavelength of the almost sine-wave signal.

The output terminal 31 is a terminal for outputting an encoder square-wave signal generated by the multiplication processing unit 30.

The control unit 32 comprehensively controls the whole multiplication signal processor 3.

The first switch setting input terminal 34a is an input terminal for executing setting control of the first switch 14a when setting control of the first switch 14a via the first switch control terminal 24a is not performed. Similarly, the second switch setting input terminal 34b is an input terminal for executing setting control of the second switch 14b when setting control of the second switch 14b via the second switch control terminal 24b is not performed.

For example, a setting for outputting signals other than the center voltage of an almost sine-wave analog signal from the A phase output terminal 16a and B phase output terminal 16b can be made via the first switch setting input terminal 34a and second switch setting input terminal 34b.

Note that the first switch setting input terminal 34a and second switch setting input terminal 34b may be configured so that they can be fixed to a state corresponding to the normal use state of the encoder head 2 by pull-up, pull-down, or the like. This configuration can further improve convenience.

As described above, the multiplication signal processor 3 receives almost sine-wave analog signals of two phases output from the encoder head 2. Then, the multiplication signal processor 3 performs multiplication processing to set the resolution to be four or more times higher than one cycle of the almost sine-wave analog signal, thereby converting the almost sine-wave analog signals into encoder square-wave signals and outputting the encoder square-wave signals.

Offset voltage correction processing and displacement detection processing by the encoder 1 having the above-described arrangement will be exemplified.

First, when the power supply 5 is turned on (ON) and the power supply voltage reaches a predetermined voltage value, the operation mode switching unit 21 switches the operation state of the multiplication signal processor 3 to the "offset voltage detection mode".

Then, the offset voltage signal stabilization unit 23 stabilizes offset voltages. More specifically, the offset voltage signal stabilization unit 23 stabilizes (the center voltage values of) almost sine-wave analog signals output from the A phase output terminal 16a and B phase output terminal 16b of the encoder head 2.

In detection of the offset voltages, even a signal input from the reference voltage input terminal 25 preferably has a stable value. Hence, the offset voltage signal stabilization unit 23 preferably executes stabilization processing even for a signal input from the reference voltage input terminal 25.

After stabilizing the center voltage values of almost sine-wave analog signals output from the A phase output terminal 16a and B phase output terminal 16b of the encoder head 2, the control unit 32 starts controlling the first switch 14a and second switch 14b via the first switch control terminal 24a and second switch control terminal 24b so as to output the center voltages of almost sine-wave analog signals from the A phase output terminal 16a and B phase output terminal 16b of the encoder head 2.

The offset voltage detection unit 27 detects offset voltages based on the center voltages of the almost sine-wave analog signals stabilized by the foregoing processing using the timer 23A which forms the offset voltage signal stabilization unit 23. The offset voltage detection processing changes depending on the contents of multiplication processing by the multiplication processing unit 30. The offset voltage detection processing will be explained using examples.

Processing Example 1

The multiplication signal processor 3 performs signal processing based on signals of two phases (A phase signal and B phase signal) different by about 90° which are almost sine-wave analog signals output from the A phase output terminal 16a and B phase output terminal 16b of the encoder head 2, and a reference voltage output from the reference voltage output terminal 15.

More specifically, as shown in FIG. 3A, the differences between the center voltages of the A phase signal and B phase signal with respect to the reference voltage, and the reference voltage are detected as offset voltages.

Processing Example 2

In addition to the A phase signal and B phase signal, an AB phase signal or BB phase signal different in phase by 180° from the A phase signal or B phase signal is generated. The multiplication processing unit 30 performs signal processing based on these three phases (A phase signal, B phase signal, and AB phase signal or BB phase signal) by resistance division or the like.

Figure 3B:
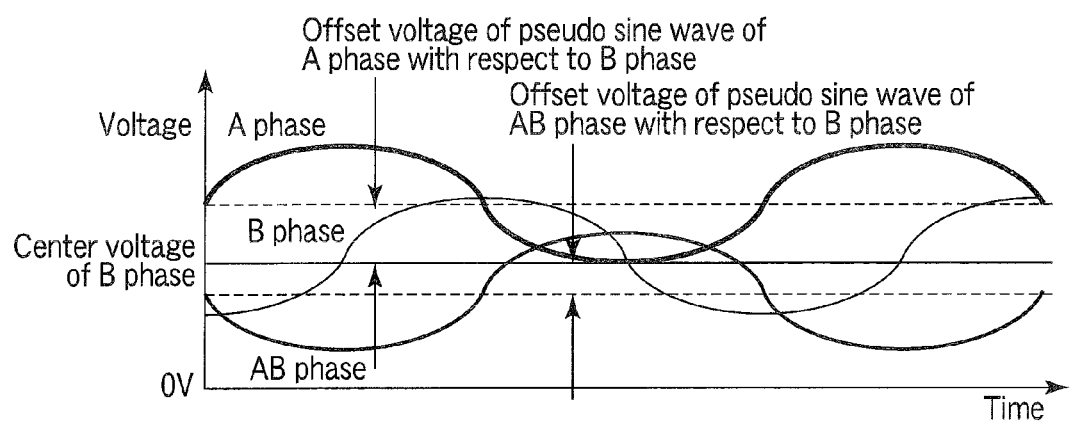
FIG. 3B is a graph exemplifying offset voltage detection processing.

More specifically, the center voltage of one of these phase signals is set as a reference, and the differences between the center voltage serving as the reference, and the center voltages of the remaining two phase signals are detected as offset voltages. FIG. 3B shows an example in which the center voltage of the B phase is set as a reference. In the example shown in FIG. 3B, the differences between the center voltage of the B phase signal (90° phase difference) serving as the reference, and those of the A phase signal (0° phase reference) and AB phase signal (180° phase difference) are detected as offset voltages.

Processing Example 3

Figure 3C:
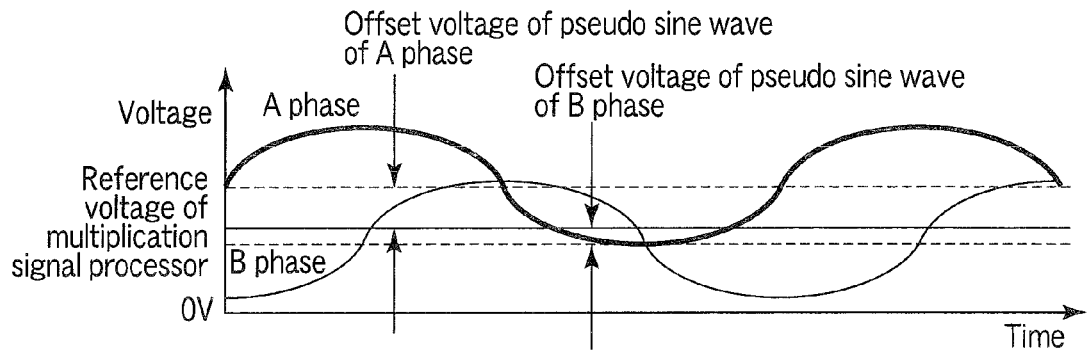
FIG. 3C is a graph exemplifying offset voltage detection processing.

The multiplication processing unit 30 generates a reference voltage. Based on the reference voltage value, the multiplication processing unit 30 executes signal processing. More specifically, as shown in FIG. 3C, a value generated by the multiplication processing unit 30 is set as a reference voltage, and the differences between the reference voltage, and the center voltages of the A phase signal and B phase signal are detected as offset voltages.

Processing Example 4

The differences between the A phase signal and B phase signals, and signals different in phase by 180° from them are calculated (e.g., A phase-AB phase and B phase-BB phase). Based on an A' phase signal and B' phase signal generated by the calculation, the multiplication processing unit 30 performs signal processing.

More specifically, the differences between the A' phase signal and B' phase signal, and a reference voltage used in the multiplication processing unit 30 are detected as offset voltages.

After the offset voltage detection processing is completed by a method such as <<Processing Example 1>> to <<Processing Example 4>> described above, the offset voltage storage unit 28 stores the offset voltages.

The control unit 32 stops (OFF) the control of the first switch 14a via the first switch control terminal 24a and that of the second switch 14b via the second switch control terminal 24b. At this time, the output of the center voltages of the A phase signal and B phase signal from the A phase output terminal 16a and B phase output terminal 16b of the encoder head 2 stops.

The encoder 1 shifts to detection processing for the displacement amount of the encoder head 2 and scale 4. The displacement amount detection processing will be explained.

First, the operation mode switching unit 21 switches the operation state of the multiplication signal processor 3 to the displacement amount detection processing mode. Then, the A phase input terminal 26a and B phase input terminal 26b of the multiplication signal processor 3 receive the A phase signal and B phase signal which are almost sine-wave analog signals respectively output from the A phase output terminal 16a and B phase output terminal 16b of the encoder head 2.

The offset voltage correction unit 29 corrects the almost sine-wave analog signals received via the A phase input terminal 26a and B phase input terminal 26b based on values (offset voltages) stored in advance in the offset voltage storage unit 28.

The multiplication processing unit 30 executes multiplication processing for the A phase signal and B phase signal corrected by the offset voltage correction unit 29, generating encoder square-wave signals (signals countable by the counter) and outputting them from the output terminal 31.

Needless to say, in the series of displacement amount detection processes, the control unit 32 performs control for executing the displacement amount detection processing. For example, the control unit 32 executes control of transferring the setting state of the first switch setting input terminal 34a to the first switch 14a of the encoder head 2, and that of the second switch setting input terminal 34b to the second switch 14b of the encoder head 2 to operate the encoder head 2 in a predetermined state.

Figure 4:
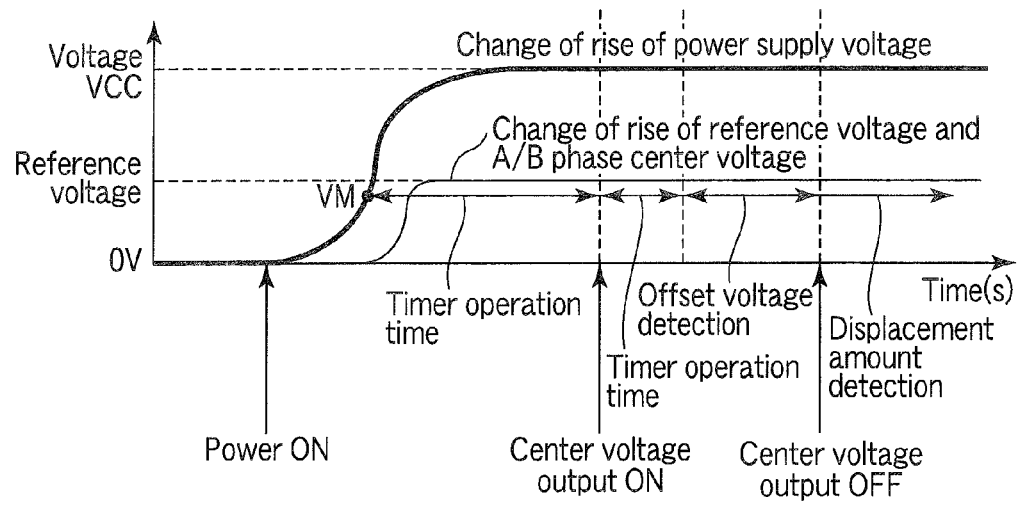
FIG. 4 is a timing chart exemplifying processing by the encoder according to the embodiment of the present invention.

FIG. 4 is a timing chart exemplifying processing by the encoder having the arrangement shown in FIG. 2. As shown in FIG. 4, when the power supply 5 is turned on (ON), the value of a power supply voltage applied to the power supply terminal 21A of the multiplication signal processor 3 gradually rises until it reaches a predetermined driving voltage VCC.

If the power supply voltage reaches the predetermined voltage value VM, the power supply voltage detection unit 21B detects the power supply voltage. By using the detection of the power supply voltage by the power supply voltage detection unit 21B as a trigger, the control unit 32 switches the operation state of the multiplication signal processor 3 to the offset voltage detection mode.

Note that the control unit 32 may switch the operation state of the multiplication signal processor 3 to the offset voltage detection mode at an arbitrary timing using the offset voltage correction control terminal 21C. When the operation state of the multiplication signal processor 3 switches to the offset voltage detection mode at an arbitrary timing, the offset voltage correction control terminal 21C accepts a signal transmitted from the outside at an arbitrary timing for switching to the offset voltage detection mode. Based on this signal, the control unit 32 switches the operation state to the offset voltage detection mode.

In the encoder 1 having the arrangement shown in FIG. 2, the control unit 32 executes the following processes in the displacement amount detection processing, in addition to the same processing as that by the encoder 1 having the arrangement shown in FIG. 1:

<<Processing 1>> monitoring of an externally input signal to the offset voltage correction control terminal 21C <<Processing 2>> monitoring of a power supply voltage via the power supply voltage detection unit 21B so that the power supply voltage does not reach a value equal to or smaller than a predetermined level As described above, the embodiment can provide an encoder which solves the problem of the phase error arising from the offset voltage, and improves the linearity of an encoder square-wave signal serving as an output signal. More specifically, the encoder according to the embodiment can obtain the following effects:

Correction can be done based on not an unstable offset voltage value immediately after power-on, but a stable offset voltage value.

The encoder 1 can be used immediately after power-on without displacing the encoder head 2 and scale 4 for a predetermined time after power-on (a conventional encoder can be used only after displacing the encoder head and scale for a predetermined time after power-on).

No complicated arithmetic processing is necessary in offset voltage detection processing, and an offset voltage can be automatically, accurately detected by simple processing upon activation of the encoder. Thus, the encoder does not require a memory which stores an offset voltage value in the multiplication signal processor 3 in a nonvolatile way.

The encoder 1 can easily cope with a change of the encoder head 2, and even a change of the offset voltage over time.

The encoder 1 can easily cope with a change of the offset voltage upon a change or modification of the use environment of the encoder 1.

Multiplication processing can be executed to increase the resolution without any influence of the offset voltage arising from the signal processing system in the encoder 1.

The multiplication processing can be performed even for an encoder signal whose amplitude is small compared to the offset voltage.

The linearity of the encoder square-wave signal is improved.

In the encoder 1 having the arrangements shown in FIGS. 1 and 2, switches (first switch 14a and second switch 14b), switch control terminals (the first switch control terminal 24a and the second switch control terminal 24b), and switch setting input terminals (first switch setting input terminal 34a and second switch setting input terminal 34b) are arranged by the number of control modes for descriptive convenience. However, it suffices to arrange at least one switch, one switch control terminal, and one switch setting input terminal.

In the above description, an optical encoder has been assumed. However, the embodiment can be properly modified and applied to even a magnetic encoder, electrostatic encoder, and the like.

The present invention has been described based on the embodiment. However, the present invention is not limited to the above embodiment, and can be modified and applied as follows without departing from the scope of the invention.

[First Modification]

An encoder according to the first modification of the present invention will be described with reference to the accompanying drawing. To avoid a repetitive description, a difference from the encoder according to the embodiment will be explained.

FIG. 5A is a block diagram exemplifying the arrangement of the encoder head of the encoder according to the first modification. The encoder according to the first modification is different from that according to the embodiment in the arrangement of the encoder head. Note that the arrangement of the encoder head of the encoder according to the first modification is applicable to even the encoder according to the embodiment.

More specifically, in the first modification, the displacement detection unit 12 is configured as follows. That is, the displacement detection unit 12 includes an LED 117, LED driver 118, and PD 119.

The LED 117 is a light source which irradiates the scale 4.

The LED driver 118 drives the LED 117.

The PD 119 receives a bright and dark image reflected by the scale 4.

With this arrangement, the connection between the LED 117 and the LED driver 118 is canceled under the control of the first switch 14a and second switch 14b, or the amount of driving by the LED driver 118 is set to almost 0. As a result, the center voltages of almost sine-wave analog signals are output from the A phase output terminal 16a and B phase output terminal 16b.

[Second Modification]

An encoder according to the second modification of the present invention will be described with reference to the accompanying drawing. To avoid a repetitive description, a difference from the encoder according to the embodiment will be explained.

FIG. 5B is a block diagram exemplifying the arrangement of the encoder head of the encoder according to the second modification. The encoder according to the second modification is different from that according to the embodiment in the arrangement of the encoder head. Note that the arrangement of the encoder head of the encoder according to the second modification is applicable to even the encoder according to the embodiment.

More specifically, in the second modification, a switch 220 is interposed between the displacement detection unit 12 and the signal processing unit 13. A signal is transferred between the displacement detection unit 12 and the signal processing unit 13 by turning off the switch 220 under the control of the first switch 14a and second switch 14b. In response to this, the center voltages of almost sine-wave analog signals are output from the A phase output terminal 16a and B phase output terminal 16b.

[Third Modification]

An encoder according to the third modification of the present invention will be described with reference to the accompanying drawing. To avoid a repetitive description, a difference from the encoder according to the embodiment will be explained.

Figure 5C:
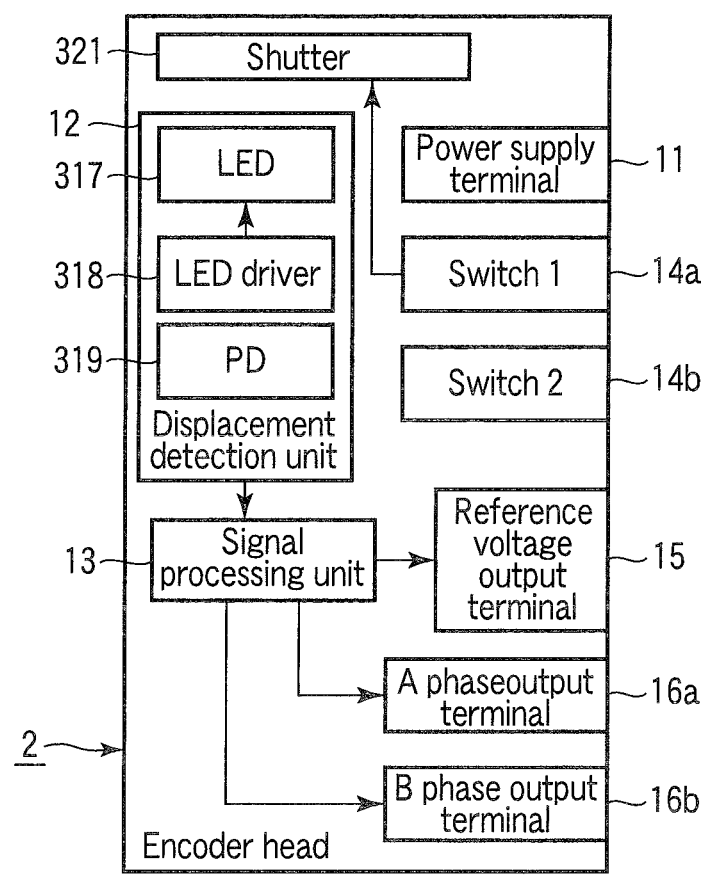
FIG. 5C is a block diagram exemplifying the arrangement of the encoder head of an encoder according to the third modification.
Figure 6:
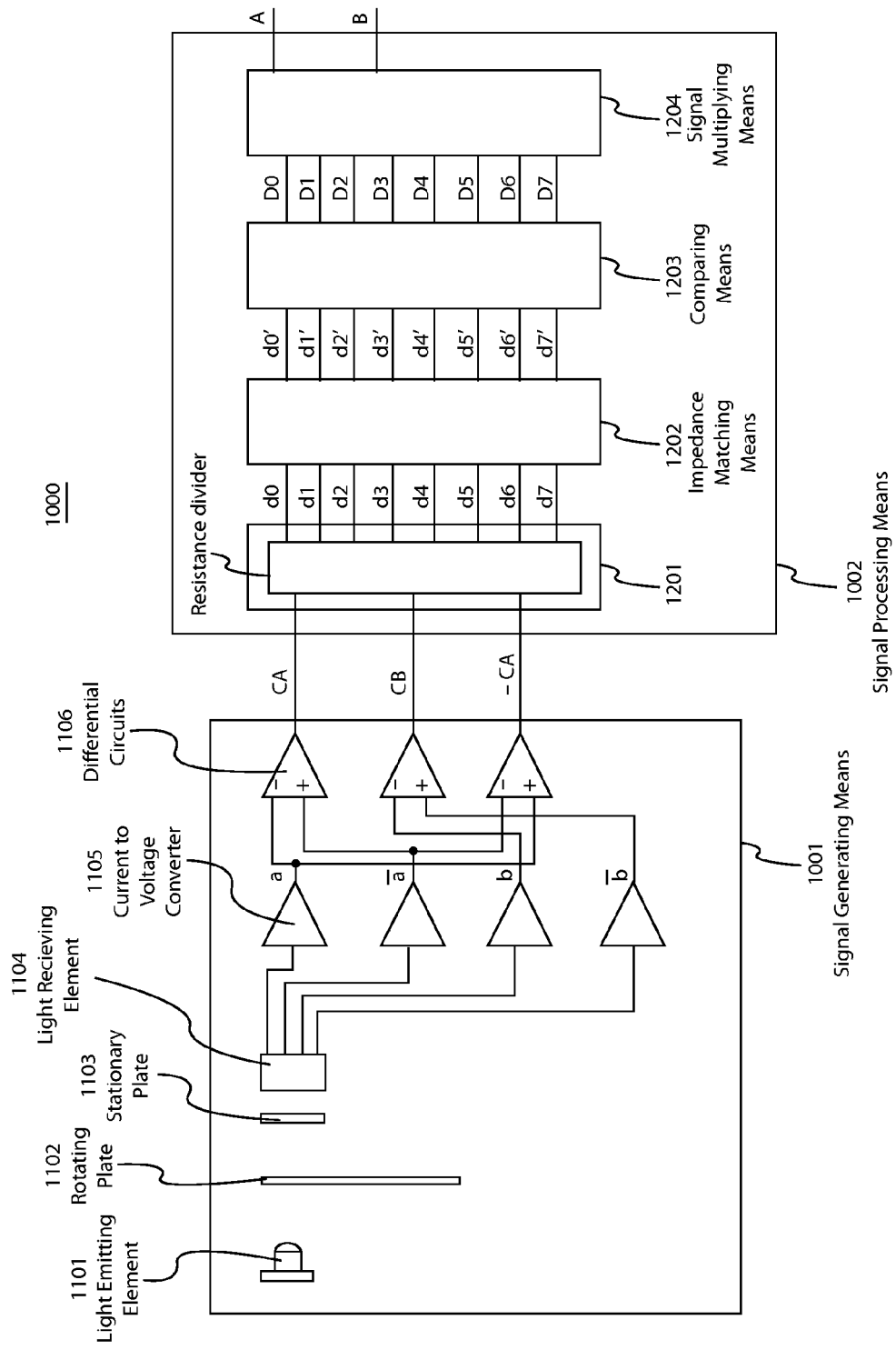
FIG. 6 is a block diagram exemplifying the arrangement of a conventional encoder.

FIG. 5C is a block diagram exemplifying the arrangement of the encoder head of the encoder according to the third modification. The encoder according to the third modification is different from that according to the embodiment in the arrangement of the encoder head. Note that the arrangement of the encoder head of the encoder according to the third modification is applicable to even the encoder according to the embodiment.

More specifically, in the third modification, the encoder head 2 is configured as follows. That is, a shutter 321 is newly arranged at a portion where the encoder head 2 faces the scale 4. In addition, the displacement detection unit 12 includes an LED 317, LED driver 318, and PD 319.

The LED 317 is a light source which irradiates the scale 4.

The LED driver 318 drives the LED 317.

The PD 319 receives an occulting signal reflected by the scale 4.

The shutter 321 cuts transfer of an optical signal between the PD 319 which receives an occulting signal reflected by the scale 4, and the scale 4 (in other words, cuts the optical path).

With this arrangement, the shutter 321 is operated to cut the optical path under the control of the first switch 14a. Accordingly, the center voltages of almost sine-wave analog signals are output from the A phase output terminal 16a and B phase output terminal 16b.

The first to third modifications have been described. However, the above-described embodiment and modifications include inventions on various stages, and various inventions can be extracted by an appropriate combination of building components disclosed. For example, even if several building components are omitted from all those described in the embodiment and modifications, an arrangement from which the building components are omitted can also be extracted as an invention as long as the problems described in Description of the Related Art can be solved and effects described in BRIEF SUMMARY OF THE INVENTION can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An encoder comprising a scale, an encoder head configured to generate a signal based on a relative displacement from the scale, and a multiplication signal processor configured to perform multiplication processing for a signal generated by the encoder head, the encoder head comprising:

a displacement detector configured to detect the relative displacement of the scale and the encoder head;

a signal processor configured to generate a substantially sine-wave signal based on the displacement detected by the displacement detector;

a switch configured to make a setting for outputting a center voltage of the substantially sine-wave signal generated by the signal processor to the multiplication signal processor; and an output terminal configured to output one of the substantially sine-wave signal and the center voltage of the substantially sine-wave signal to the multiplication signal processor, and the multiplication signal processor being configured to implement:

switching a processing mode to one of an offset voltage detection processing mode in which an offset voltage serving as a difference between a predetermined reference voltage and the center voltage is detected, and a displacement amount detection processing mode in which displacement detection processing is performed;

controlling a setting state of the switch;

when the switching switches the processing mode to the offset voltage detection processing mode, detecting the offset voltage based on the center voltage of the substantially sine-wave signal output from the output terminal, and the predetermined reference voltage;

when the switching switches the processing mode to the displacement amount detection processing mode, correcting an offset voltage of the substantially sine-wave signal output from the output terminal based on the offset voltage detected by the offset voltage detecting; and performing multiplication processing for the substantially sine-wave signal corrected by the offset voltage correcting;

wherein the controlling controls the setting state of the switch in the displacement amount detection processing mode according to a setting of a terminal configurable by the controlling, wherein the controlling is a process other than the multiplication processing.

2. The encoder according to claim 1, wherein the switching implemented by the multiplication signal processor further comprises:

detecting that a power supply voltage supplied to the encoder has reached a predetermined value, and switching the processing mode to the offset voltage detection processing mode when the power supply voltage detecting detects that the power supply voltage has reached the predetermined value.

3. The encoder according to claim 1, wherein the multiplication signal processor further implements stabilizing the center voltage of the substantially sine-wave signal when the switching switches the processing mode to the offset voltage detection processing mode.

4. The encoder according to claim 3, wherein the multiplication signal processor comprises a timer configured to control subsequent processing to stand by until lapse of a predetermined time after the switching switches the processing mode to the offset voltage detection processing mode.

5. The encoder according to claim 1, wherein the switch outputs the center voltage of the substantially sine-wave signal from the output terminal by performing one of a setting of stopping driving of the displacement detector, a setting of disconnecting a signal transfer line between the displacement detector and the signal processor, and a setting of shielding the displacement detector and the scale from each other.

* * * * *